(12) United States Patent (10) Patent No.: US 8,947,775 B2
Sasian-Alvarado et al. (45) Date of Patent: Feb. 3, 2015

(54) CATADIOPTRIC OPTICAL SYSTEM WITH TOTAL INTERNAL REFLECTION FOR HIGH NUMERICAL APERTURE IMAGING

(75) Inventors: Jose Manuel Sasian-Alvarado, Tucson, AZ (US); Masatsugu Nakano, Irvine, CA (US)

(73) Assignees: The Arizona Board of Regents on Behalf of the University of Arizona, Tucson, AZ (US); Canon Kabushiki Kaisha, Tokyo (JP)

( * ) Notice: Subject to any disclaimer, the term of this patent is extended or adjusted under 35 U.S.C. 154(b) by 301 days.

(21) Appl. No.: 13/492,078

(22) Filed: Jun. 8, 2012

(65) Prior Publication Data

US 2013/0329283 A1 Dec. 12, 2013

(51) Int. Cl.
*G02B 17/00* (2006.01)
(52) U.S. Cl.
USPC ........................................................ 359/366
(58) Field of Classification Search
USPC .................................. 359/364–365, 727–736
See application file for complete search history.

(56) References Cited

U.S. PATENT DOCUMENTS

| 2,683,394 A | 7/1954 | Polanyi et al. |
| 5,650,877 A | 7/1997 | Phillips, Jr. et al. |
| 5,930,055 A | 7/1999 | Eisenberg |
| 6,493,156 B1 | 12/2002 | Oh et al. |
| 2010/0188856 A1* | 7/2010 | Ford et al. ..................... 362/299 |

FOREIGN PATENT DOCUMENTS

| WO | 2008101676 A2 | 8/2008 |
| WO | 2008101676 A3 | 10/2008 |

OTHER PUBLICATIONS

Grey et al.,"A New Series of Microscope Objectives:I. Catadioptric Newtonian Systems", Journal of Optical Society of America, Sep. 1949, pp. 719-722, vol. 39, No. 9.
Burchroeder,"Application of Aspherics for Weight Reduction in Selected Catadioptric Lenses", Naval Electronics Systems Command, Jul. 1971, pp. 1-54.

* cited by examiner

*Primary Examiner* — Jennifer L. Doak
(74) *Attorney, Agent, or Firm* — Canon USA Inc. IP Division

(57) ABSTRACT

A catadioptric optical system includes, in order from an object side to an image side and arranged along an optical axis, a first catadioptric unit, a second catadioptric unit disposed in axial alignment with the first catadioptric unit and with a space therebetween; and a lens group disposed in axial alignment with the first and second catadioptric optical units. Light rays arriving from an object plane undergo a first reflection at the image-side surface of the first catadioptric optical unit, a second reflection at the object-side surface of the first catadioptric optical unit, a third reflection at the image-side surface of the second catadioptric optical unit, and a fourth reflection at the object-side surface of the second catadioptric optical unit. Advantageously, the sum the outward Petzval curvatures is cancelled out by the sum of inward Petzval curvatures.

18 Claims, 7 Drawing Sheets

CATADIOPTRIC OPTICAL SYSTEM WITH TOTAL INTERNAL REFLECTION FOR HIGH NUMERICAL APERTURE IMAGING

BACKGROUND OF THE INVENTION

1. Field of the Invention

The present invention is generally related optical imaging, and more particularly it is related to a catadioptric optical system with total internal reflection for high numerical aperture imaging; the catadioptric optical system may find industrial application in microscope objective systems or lithographic projection systems, among others.

2. Description of the Related Art

Imaging apparatuses, such as a microscope, a lithographic projection system, or even a telescope, use purely reflective (catoptric), purely refractive (dioptric), or a combination of reflective and refractive (catadioptric) optical elements to form an image of an object. A microscope uses an objective optical system to observe a sample, such as a biological tissue, a defect on a semiconductor wafer or a surface of material. A lithographic projection system uses a projection objective to project an image of a pattern on a reticle onto a planar image surface of a semiconductor substrate (wafer). In a telescope, an objective lens, larger in diameter than the pupil of a human eye, permits the collection of enough light to make visible distant point sources such as stars that otherwise may not be observed. To produce a good image, these instruments must collect enough light reflected from (or transmitted through) an object, separate the details in the image, magnify the image, and render the details visible to the human eye or resolvable by an optical detector.

The ability to resolve fine object details at a fixed object distance, regardless of whether the details correspond to physically close features (as in a microscope) or to features separated by a small angle (as in a telescope), is determined by the instrument's resolution. Resolution (R) of a microscope is given by Equation (1).

$$R = 0.61 \times \frac{\lambda}{NA} \quad (1)$$

Where $\lambda$ is the wavelength of the light used, NA is the numerical aperture of the microscope's object space, and 0.61 is derived from the Rayleigh criterion.

From Equation (1), therefore, the resolution R can be improved by decreasing the wavelength $\lambda$, or increasing the NA. In terms of decreasing the wavelength $\lambda$, the use of ultraviolet (UV), deep ultraviolet (DUV), X-ray, and electron beam radiation has been investigated extensively for high-resolution applications in microscopy and lithography. However, these applications are prohibitively expensive, and accordingly there is greater need for imaging using the visible spectrum (wavelengths between 400-700 nanometers approximately), as in the case of optical microscopes.

Therefore, the vast majority of optical microscopes have objectives designed to fulfill certain NA requirements. NA is determined by the instruments' ability to gather enough light to resolve fine object details. In terms of its ability to gather enough light, the NA of a microscope is defined by Equation (2).

$$NA = N_o \sin \theta_m \quad (2)$$

where $N_o$ is the refractive index of the medium in object space, $\theta_m$ is the angle formed between the marginal ray that comes from the object and the normal to the surface where the marginal ray impinges (hereinafter $\theta_m$ is referred to as the "marginal angle").

From the perspective of Equation (2), therefore, in order to obtain a high NA value, either the angle $\theta_m$ of the marginal ray or the refractive index $N_o$ of the medium in object space need to be large. As it is generally known to persons having ordinary skill in the art, the medium in the object space of a microscope can be air or an immersion fluid. When air ($N_o=1$) is used in the object space, the maximum value of NA cannot be greater than unity, but when the object space is filled with a fluid of index larger than 1 ($N_o>1$) a NA larger than 1 can be achieved. Incidentally, most conventional optical microscopes use objectives with NA values in the approximate range of 0.08 to 1.30, with the proviso that NA values greater than 0.95 can typically be achieved only by using an immersion fluid in the object space. Accordingly, to further increase the NA value, regardless of the medium in the object space, the angle $\theta_m$ of the marginal ray needs to be increased. However, this requires significantly complicated optical arrangements for correcting aberrations.

Specifically, many conventional optical designs for high NA values use catadioptric optical elements to minimize optical aberrations. See, for example, U.S. Pat. No. 5,650,877, international publication number WO2008/101676 (herein "WO2008/101676"), and the article "A New Series of Microscope Objective: I. Catadioptric Newtonian Systems," JOSA 39, No. 9, 719-723 (1949), by Grey et al. (herein "Grey").

U.S. Pat. No. 5,650,877 discloses a lithographic reduction system in which a catadioptric optical element having specially configured front and back faces projects a reduced image of a reticle onto a substrate. The back face of the optical element has a central aperture surrounded by a concave reflective surface. The front face has a partially reflective surface that transmits a portion of the light beam toward the concave reflecting surface and reflects a portion of the remaining light beam returned by the concave reflective surface on a converging path through the central aperture. The substrate is aligned with the aperture, and is therefore exposed with high-resolution.

WO2008/101676 discloses a lithographic projection system in which a catadioptric optical element made of a high-index transparent material has a first surface on an object-side of the element and a second surface opposite to the first surface. The second surface has a transmissive portion in a central region around the optical axis and a concave reflective portion in a zone around the transmissive portion. The first surface has a transmissive zone to transmit radiation coming from the object surface towards the second surface and oriented relative to the second surface such that at least a portion of radiation reflected by the reflective portion of the second surface is totally reflected by the transmissive portion of the first surface towards the transmissive portion of the second surface.

Grey discloses a microscope objective with a last solid lens made of fluorite or quartz-fluorite, where both object-side and image-side surfaces of the lens contain reflective coating on certain regions thereof to achieve NA values greater than 0.95 at 220 to 540 nanometer wavelengths purportedly with negligible aberrations.

A feature common to each of the above-discussed background references is the last optical element which a catadioptric optical element (COE) in which a central obscuration blocks a portion of the light from passing through the central region thereof. Generally, the obscuration ratio—which characterizes the fraction of blocked illumination—is defined by the following equation (3):

$$\text{Obscuration} = \frac{\sin\theta_l}{\sin\theta_m} \quad (3)$$

where $\theta_1$ is the lowest angle to achieve the required obscuration ratio (hereafter $\theta_1$ will be referred to as the "lowest obscuration angle"), and $\theta_m$ is the marginal angle, as defined in Equation (2). Accordingly, a central obscuration larger than a certain threshold (e.g., 25%) can cause significant degradation in image contrast and loss of light intensity, which in turn degrades the quality of a resultant image.

According to U.S. Pat. No. 5,650,877, the central obscuration may be limited by controlling the size of the illumination beam to block no more than 15 percent of the projected image. However, although relatively low obscuration may be obtained by controlling the size of the illumination beam, substantial energy loss is caused by this technique.

On the other hand, in the catadioptric optical element disclosed by WO2008/101676 total internal reflection (TIR) is used to minimize obscuration while achieving a desired level of NA. FIG. 1 illustrates a concept of the catadioptric optical element disclosed by WO2008/101676.

The left side of FIG. 1 illustrates a side view of a catadioptric lens 10, which has a first surface 11 and a second surface 12 opposite to each other. The first surface 11 is generally concave when seen from the side of the second surface 12, and the second surface 12 is substantially planar (flat). A plane view of the substantially planar second surface 12 is illustrated on the right side of FIG. 1. The first surface 11 has a transmissive portion in a central region around the optical axis AX and a concave reflective portion in a region around the transmissive portion. That is, the transmissive portion and the concave reflective portion are concentric to each other. The second surface 12 is generally transparent and has a total internal reflection (TIR) region 16 and transmissive region 17, which are concentric to each other and also centered on the optical axis AX. Light rays illuminating an object O passes through the transmissive portion of the first surface 11 and impinges first on the second surface 12. More specifically, light rays R2 and R3 having angles of incidence between the critical angle $\theta_c$ and the marginal angle $\theta_m$ undergo total internal reflection on the TIR region 16 of the second surface 12, and are therefore reflected towards the reflective portion of the first surface 11. In turn, the reflective portion of the first surface 11 reflects these rays forward towards the second surface 12 as light rays R2' and R3'. This time, since the incident angles of rays R2' and R3' are less than the critical angle $\theta_c$, the rays R2' and R3' are transmitted through the TIR region 16 of the second surface 12.

On the other hand, light rays R1 propagating through the transmissive region of the first surface 11 and impinging on the transmissive region 17 of the second surface 12, at an incident angle less than the critical angle $\theta_c$ (e.g., incident at the minimum obscuration angle $\theta_1$), cannot be reflected by the second surface 12, but instead these rays are refracted as a light rays R1'. The refracted rays R1' may be scattered or blocked by a central obscuration or field stop aperture; thus, the light rays R1 with an incident angle $\theta_1$ less than the critical angle $\theta_c$ do not contribute to image formation. Moreover, the transmissive region 17 immediately around the optical axis AX is obscured because the object O itself blocks light incident normal to the object. Therefore, light rays impinging on the transmissive region 17 at incident angles small than the critical angle $\theta_c$ may degrade image contrast and cause loss of light intensity.

Furthermore, since a catadioptric optical element includes the above-described curved reflective surfaces, other problems in terms of chromatic aberration, Petzval curvature and alignment arise.

Correcting chromatic aberration, in particular, across the visible spectrum of wavelengths is particularly challenging. As it is known to persons having ordinary skill in the art, a microscope can be thought of as a positive lens. In that sense, the power of the positive lens produces what is known as "undercorrected" axial chromatic aberration. To compensate for it, overcorrected axial chromatic aberration is intentionally generated by adding specially designed optical elements within the microscope's optical system.

Image field curvature is another imaging aspect to be considered. Specifically, since an image of a sample is generally captured by a sensor, such as CCD (charged coupled device) or CMOS (complementary metal oxide semiconductor) sensor, which has a flat surface, a flat image is required at the plane where the sensor is located. Generally, however, since a microscope can be regarded as a positive lens, the power of the positive lens generates an image having an inward-curving field. The curvature of the resulting image is known as the Petzval curvature. To compensate for inward Petzval curvature, an outward-curving field is intentionally generated by adding specially designed optical elements within the microscope's optical system. Specifically, using a concave mirror has been known to be an effective method for compensating the inward Petzval curvature. It is clear, therefore, that correction of aberrations can considerably increase the number of lens elements that ultimately form the objective optical system of a microscope. This significant increase in the number of optical elements often results in a tight-fit, difficult to align, and oversized objective system.

Accordingly, there is a need for objective optical systems that can provide minimum obscuration, correction of chromatic aberration and Petzval curvature, and allow for appropriate alignment without undue difficulty.

SUMMARY OF THE INVENTION

According to an aspect of the present invention, a catadioptric optical system includes, in order from an object side to an image side and arranged along an optical axis, a first catadioptric unit, a second catadioptric unit disposed in axial alignment with the first catadioptric unit and with a space therebetween; and a lens group disposed in axial alignment with the first and second catadioptric optical units. Light rays arriving from an object plane undergo a first reflection at the image-side surface of the first catadioptric optical unit, a second reflection at the object-side surface of the first catadioptric optical unit, a third reflection at the image-side surface of the second catadioptric optical unit, and a fourth reflection at the object-side surface of the second catadioptric optical unit. The sum of outward Petzval curvatures is cancelled by the sum of inward Petzval curvatures.

Advantageously, embodiments of the present invention address the issues related to obscuration, correction of chromatic aberration and Petzval curvature, and allow for appropriate alignment without undue difficulty.

Further features of the present invention will become apparent from the following description of exemplary embodiments with reference to the attached drawings.

DESCRIPTION OF THE EMBODIMENTS

Embodiments according to the present invention will be described below with reference to the attached drawings. In the various drawings discussed below, the left side of each figure will be referred to as the front or object-side, whereas the opposite side thereof (right side) will be referred to as the back or image side. Therefore, as used herein, the side of an optical element (lens or mirror) where the object to be imaged is placed is interchangeably referred to as the "object-plane side", "object side", or "front side" of the optical element; and the side of optical element where the image is formed is interchangeably referred to as the "image-plane side", "image side" or "back side" of the optical element.

Figure 2:
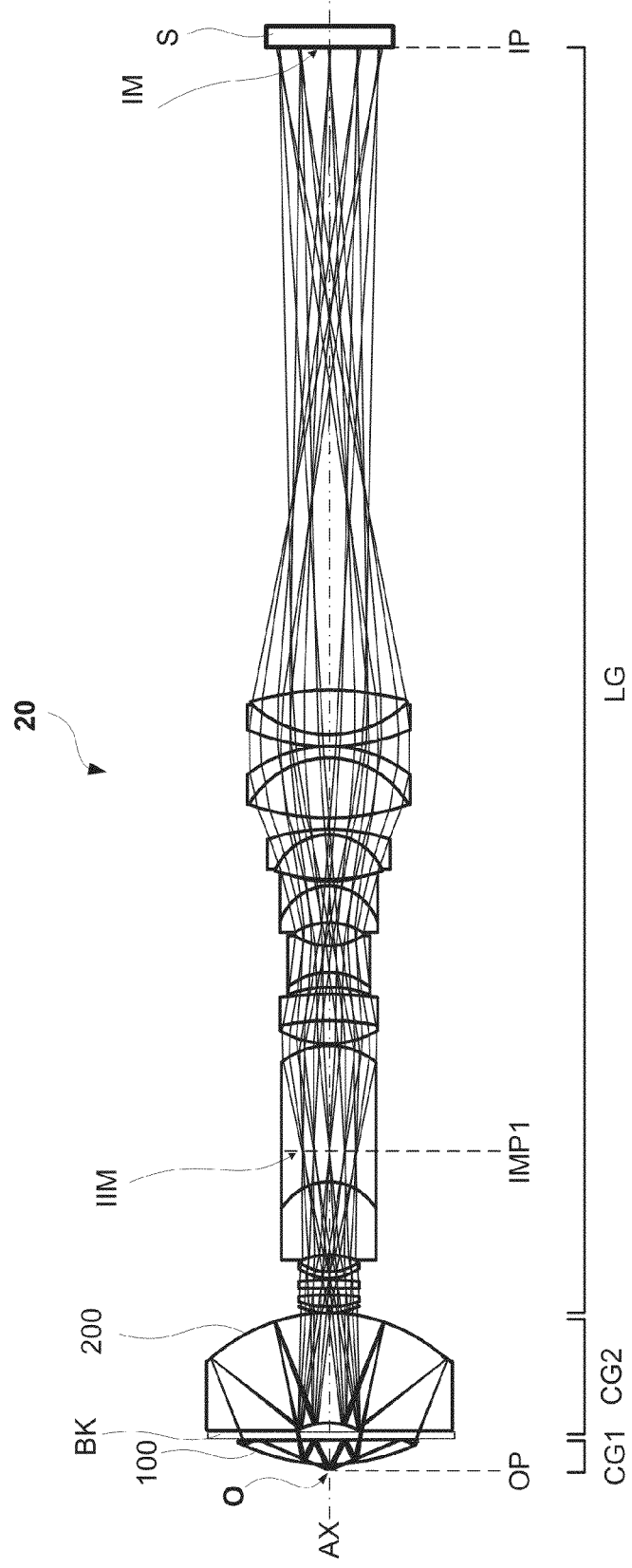
FIG. 2 illustrates a catadioptric optical system including a plurality of catadioptric units with four times reflection and one intermediate image, in accordance with an embodiment of the present invention.

FIG. 2 illustrates an exemplary embodiment of a catadioptric optical system 10. The optical system 10 generally includes, in order from the object side to the image side and aligned along an optical axis AX (in axial alignment), a first catadioptric optical unit CG1, a second catadioptric optical unit CG2 and a lens group LG. The first catadioptric optical unit CG1 consists of a single catadioptric optical element (COE) 100; and the second catadioptric optical unit CG2 includes a catadioptric optical element (COE) 200. Preferably, the second catadioptric unit CG2 is disposed at a small distance of (spaced apart from), and in axial alignment with, the first catadioptric unit CG1. The separation between the first catadioptric unit CG1 and the second catadioptric unit CG2 can be determined by a block BK, which may be implemented by either leaving an empty space (air gap) or introducing a substantially parallel piece of optically transparent material (for example glass) between CG1 and CG2. Alternatively, the block BK may correspond to an optical filter, a phase plate, or the like. Notably, the separation between CG1 and CG2 serves the purpose of easy alignment. Specifically, when the image-side surface of CG1 and the object-side surface of CG2 are substantially flat, the placement of a transparent block BK (or air gap) therebetween can make alignment thereof easier by avoiding direct contact between these two delicate optical surfaces. In order for light coming from object to be reflected by total internal reflection inside CG1, space between CG1 and CG2 needs to be filled with a medium (material) whose refractive index is lower than that of CG1. Especially, when the space is air, critical angle for total internal reflection in the TIR region of CG1 can be reduced; this means that obscuration ratio can be also decreased.

In operation, the catadioptric optical system 10 is configured to form, at an image plane IP, an image IM of an object O located at an object plane OP. The image plane IP may correspond to an image surface of a solid-state image sensor S, such as a CCD sensor or a CMOS sensor. The catadioptric optical system 10 can also operate in reverse where the object plane OP and image plane IP are interchanged, as in the case of a lithographic projection system.

Figure 3:
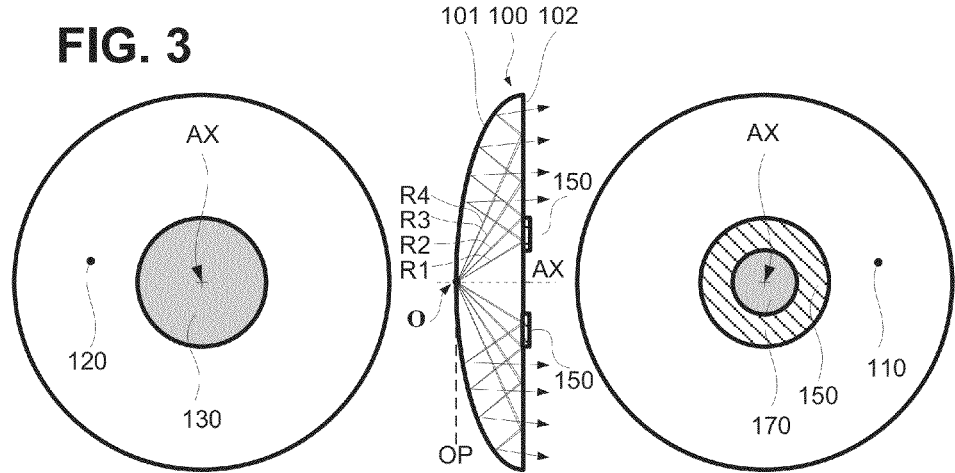
FIG. 3 illustrates side and plane views of a first catadioptric optical unit, in accordance with the present invention.
Figure 4:
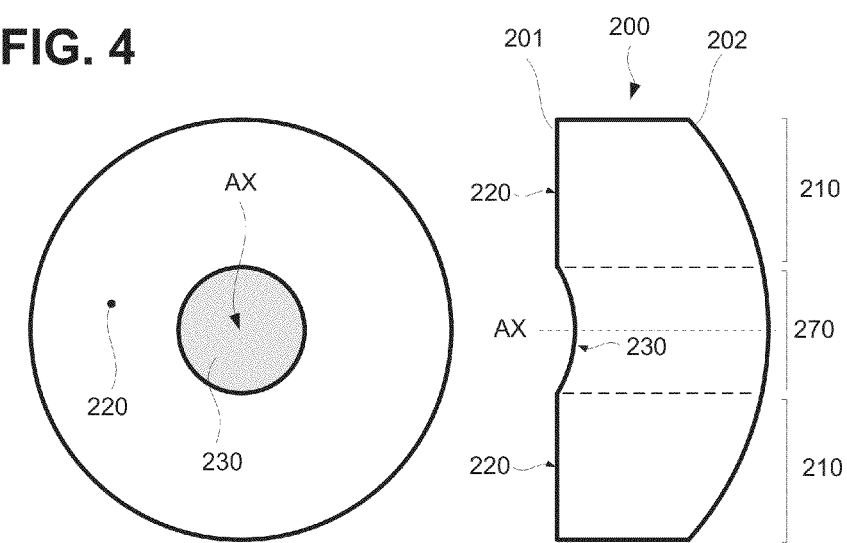
FIG. 4 illustrates side and plane views of a second catadioptric optical unit, in accordance with the present invention.

FIG. 3 illustrates a detailed view of the first catadioptric optical unit CG1; and FIG. 4 illustrates a detailed view of the second catadioptric optical unit CG2. As illustrated in FIG. 3, a plane view of the curved object-side surface 101 (front view) of COE 100 is shown on the left-most section of the figure; and a plane view of the flat image-side surface 102 (back view) of COE 100 is shown on the right-most section of the figure. A side view of COE 100 is shown in the central section of the figure. Specifically, FIG. 3 illustrates the COE 100 having an object-side surface 101 and an image-side surface 102 opposite to each other. The image-side surface 102 is a non-curved, substantially flat (planar) surface. The object-side surface 101 is a curved surface and may have either a spherical or aspherical axis symmetrical (axisymmetric) shape. In FIG. 3, as seen from the side of the image-side surface 102, the object-side surface 101 is concave.

As shown in FIG. 3, the object-side surface 101 includes a circular transmissive portion 130 (object-side transmissive portion) centered the optical axis AX and a reflective portion 120 (object-side reflective portion) in a rotationally symmetric zone around the circular transmissive portion 130. The circular transmissive portion 130 centered on the optical axis AX is an optically transparent (transmissive) region and serves to transmit therethrough light originated at an object O disposed on the optical axis AX and located at an object plane OP. At least the reflective portion 120 of the first surface 101 has a curved shape concave towards the image side thereof. The reflective portion 120 of the object-side surface 101 is preferably coated with a film of highly reflective materials to form what can be considered an inner (internal) concave mirror. That is, the reflective portion 120 is an area of COE 100 in an outer region thereof that serves as a first mirror M1, and the circular transmissive portion 130 is an area concentric to the optical axis AX not coated with the reflective coating film. Optionally, the transmissive region 130 may be coated with an anti-reflection coating (film) to increase transmission of light rays from the object O to the second surface 102.

The image-side surface 102 of COE 100 includes a central transmissive region 170 (image-side transmissive portion) centered on the optical axis AX, a ring-shaped reflective region 150 (image-side reflective portion) in a rotationally symmetric zone around the central transmissive region 170, and a total internal reflection (TIR) region 110 (image-side TIR portion) in a rotationally symmetric region around the ring-shaped reflective region 150. At least the central transmissive region 170 and the TIR region 110 are transparent surfaces devoid of any reflective coatings, so as to transmit light incident thereupon at predetermined incidence angles. The ring-shaped reflective region 150 is rendered specularly reflective preferably by coating a region of the image-side surface 102 with highly reflective materials, or by any convenient and known process. More specifically, as illustrated in FIG. 3, the ring-shaped reflective region 150 (hatched region) includes an area of the image-side surface 102 covered with a specularly reflective film, in a rotationally symmetric zone around the central transmissive region 170 and within the TIR region 110. The ring-shaped reflective region 150 namely serves to extend (enlarge) the reflective function of the TIR region 110 towards the optical axis AX.

The specularly reflective film that forms the ring-shaped reflective region 150 can be selected, for example, from a metal film such as aluminum and silver or a multilayered film made of different materials. The thickness of the reflective film may be selected, for example, between tens of nanometers and a few hundreds of micrometers. More specifically, the thickness and material of the reflective film may be chosen in accordance with the wavelength of light to be used. A material of the COE 100 can be selected, for example, from crown glass, flint glass, abnormal dispersion glass, fused silica, fluorite, etc., including equivalents and combinations thereof. Therefore, the COE 100 can be considered as a solid lens made of transparent material (for example glass) shaped as a plano-convex lens, and having an internal specularly reflective surface on at least one side thereof.

Further details concerning the structure and function of the COE 100, and in particular the ring-shaped reflective region 150 can be found in U.S. patent application Ser. No. 13/492,167 entitled "CATADIOPTRIC OPTICAL ELEMENT AND OPTICAL SYSTEM INCLUDING SAME", filed concurrently with the present application by an assignee of the present application, which is hereby incorporate by reference for all purposes.

Referring now to FIG. 4, the second catadioptric optical unit CG2 is discussed. In the present embodiment, the second catadioptric optical unit CG2 includes the catadioptric optical element (COE) 200, which may also be implemented as a solid optical element made of one or more parts (e.g., cemented catoptric and dioptric elements). As seen from the object side to the image side (left to right in FIG. 4), the COE 200 has an object-side surface 201 and an image-side surface 202 opposite to each other.

The image-side surface 202 of the COE 200 includes a circular transmissive portion 270 (image-side transmissive portion) centered on the optical axis AX, and a reflective portion 210 (image-side reflective portion) in a rotationally symmetric zone around the circular transmissive portion 270. The reflective portion 210 is silvered or made specularly reflective by any known process. Accordingly, the reflective portion 210 can be considered as a mirror M2.

Figure 5:
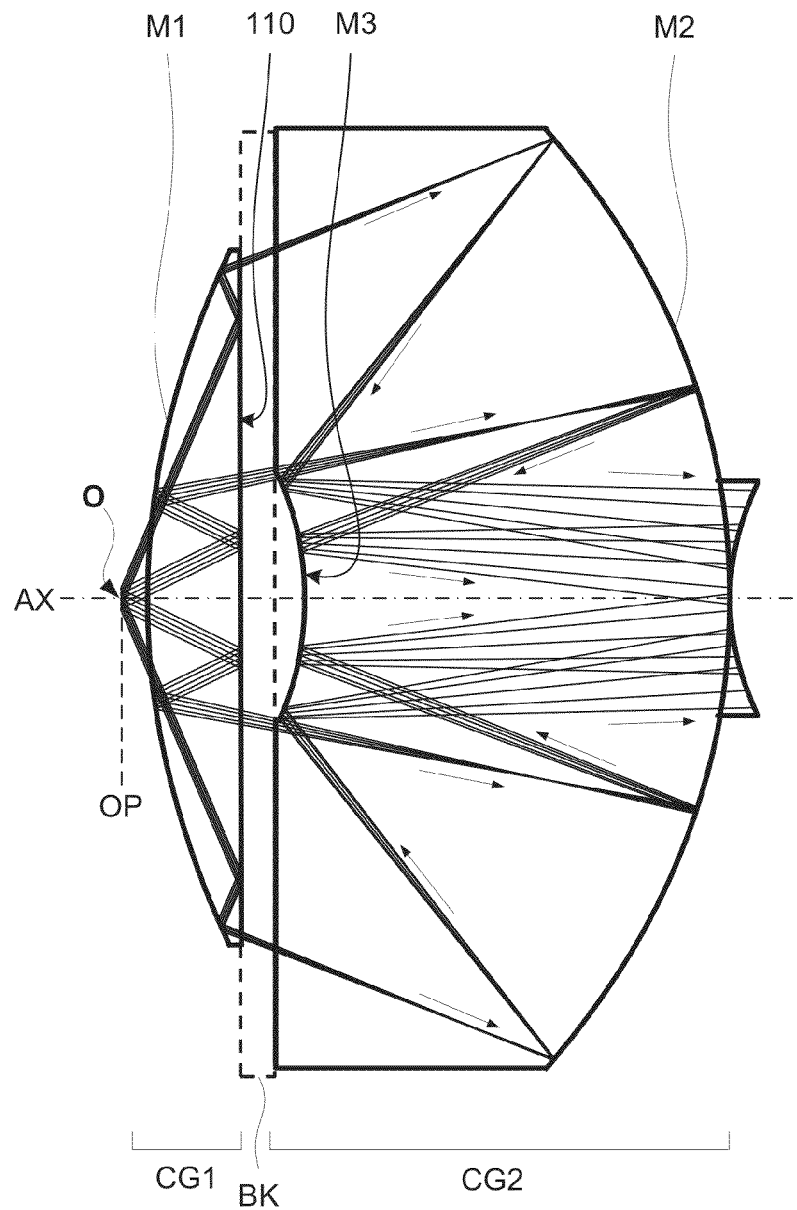
FIG. 5 illustrates an exemplary ray tracing within the first and second catadioptric optical units, in accordance with the present invention.

The object-side surface 201 includes a circular internally reflective portion 230 (object-side internal reflective portion) centered on the optical axis AX, and a transmissive portion 220 (image-side transmissive portion) in a rotationally symmetric zone around the circular reflective portion 230. At least the reflective portion 230 of the object-side surface 201 has a curved shape convex towards the image side thereof (convex towards the image-side surface 202). That is, the reflective portion 230 is in effect an internal convex mirror M3 centered on the optical axis AX and facing the image-side surface 202. The transmissive portion 220 is preferably flat and may be devoid of any coatings. Alternatively, in certain embodiments the transmissive portion 220 may include a aspheric or spheric curved surface (where the radius of curvature is much greater than the radius of curvature of the reflective region 230). In addition, the transmissive portion 220 may be optionally coated with antireflection materials to improve light transmittance therethrough. That is, as illustrated in FIG. 4, in the present embodiment, the second catadioptric optical unit CG2 consists essentially of a single catadioptric optical element (COE 200), which has an internal specularly reflective region 230 on the object-side surface 201, and an internal specularly reflective region 210 on the image-side surface 202. The image-side reflective region 210 and object-side reflective region 230 are respectively referred to as concave mirror M2 and convex mirror M3, as illustrated in FIG. 5.

Considering now a optical path from the object plane OP to the image plane IP (see FIG. 2), the image IM of an object O disposed at the object plane OP along the optical axis AX can obtained at the image plane IP, when light coming from the object O undergoes a plurality of reflections to travel from the object plane OP to image plane IP. As it is known to persons having ordinary skill in the art, multiple reflections may minimize the total length of the optical system while significantly increasing the total focal length, numerical aperture and magnification of the optical system. However, this leads to an optical system design with large obscuration ratios and augmented aberrations. In the present application, however, when properly constructed, the appropriate combination of catadioptric optical elements enables negative chromatic aberration to offset (cancel out) positive chromatic aberration, while as the same time positive Petzval curvature cancels out negative Petzval curvature. More specifically, as used herein the terms "offset" or "cancel out" are intended to denote an action to make something ineffective, to counteract, to nullify, to compensate to counterbalance, to offset an error or defect or undesired effect. Accordingly, in the specification and claims, a first value can be considered "canceled out" by a second value, when the first value is made substantially ineffective by the second value. In addition, as disclosed herein, the appropriate combination of refractive and reflective surfaces advantageously allow for reducing the obscuration ratio, increasing NA, and providing easy alignment of the optical system. Accordingly, in the remainder of the present application, the various examples of embodiments are described based on the number of reflections included in the optical path. To that end, each specularly reflective surface will be referred to as mirror Mi (where "i" is a positive integer corresponding to a specularly reflective surface counted in the direction and order in which light travels from the object plain OP to the image-plain IP.

<Four-Reflection Catadioptric System>

As illustrated in FIGS. 2-5, light rays originated at the object O enter the first catadioptric optical unit CG1 through the object-side transmissive region 130 and impinge on the image-side surface 102 of COE 100. The incoming rays undergo a first reflection at the image-side surface 102 namely due to total internal reflection, but can also undergo specular reflection, when the ring-shaped reflective region is provided on the image-side surface 102. In any case, from the image-side surface 102, the incoming rays are reflected toward the object-side reflective portion 120 (also referred to as mirror M1) whence they are reflected forward toward the image side, and exit through the image-side surface 102. Depending on the shape design of the object-side surface 101, the light rays can exit through the image-side surface 102 substantially parallel to the optical axis AX.

Figure 1:
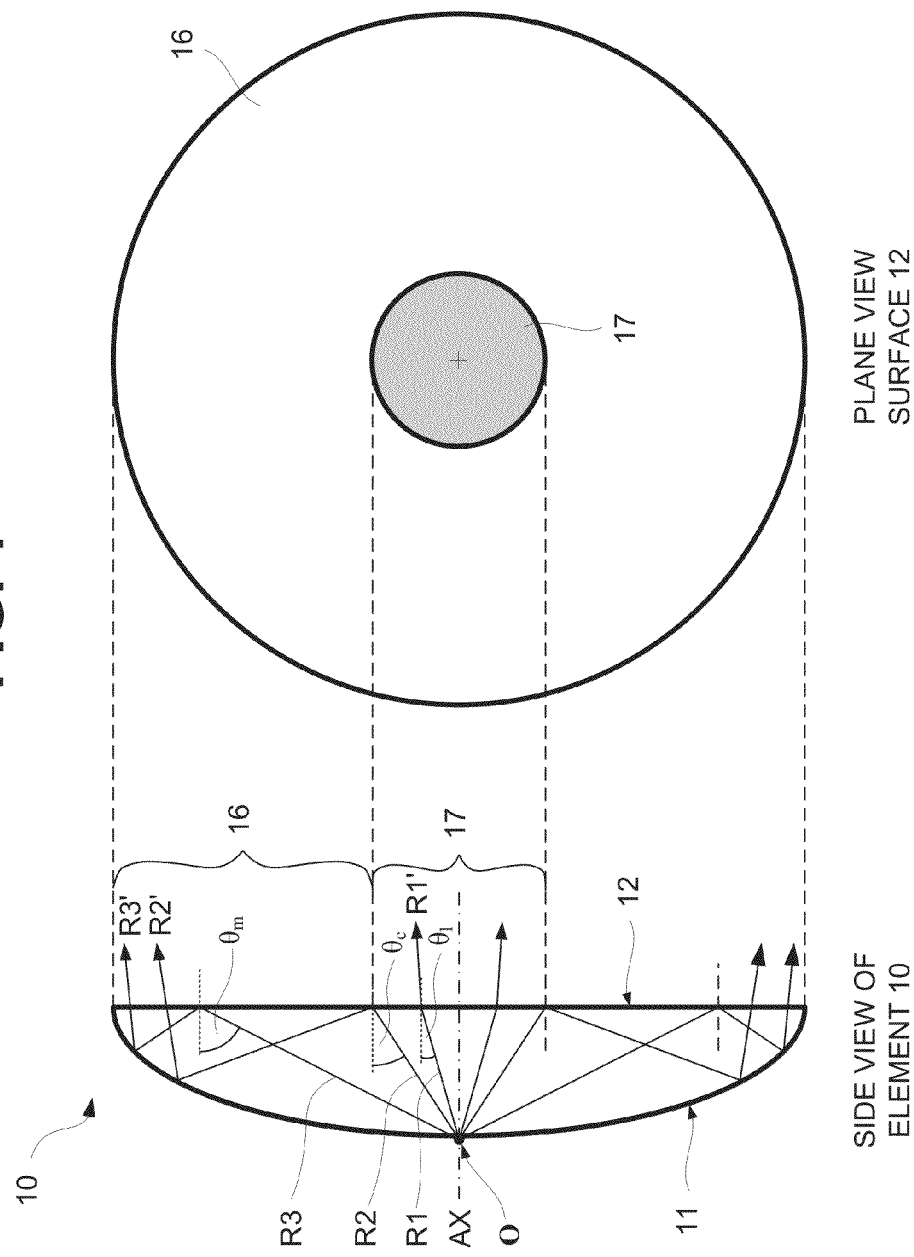
FIG. 1 illustrates relevant portions of a conventional catadioptric optical element.

Continuing to refer to FIG. 3, it should also be noted that the TIR region 110 on the image-side surface 102 is configured to reflect back (by total internal reflection) the light rays R2 and R3 incident thereupon at an incidence angle greater than the critical angle $\theta_c$ and equal to or smaller than a marginal angle $\theta_m$. In addition, the ring-shaped reflective region 150 may be provided to specularly reflect the light rays R1 and R2 impinging thereupon at incidence angles equal to or smaller than the critical angle $\theta_c$ and equal to or larger than the lowest obscuration angle $\theta_1$. In turn, the reflective portion 120 (also referred to as mirror M1), on the object-side surface 101, is configured to reflect the light rays forward towards the TIR region 110 of image-side surface 102. In this manner, in the present invention, contrary to the conventional technique of FIG. 1, all of the light rays R1 to R4 impinging on the image-side surface 102 at an incident angle smaller than the marginal angle $\theta_m$ and greater than the lowest obscuration angle $\theta_1$ contribute to image formation. Accordingly, it can be appreciated that the structure of the first catadioptric optical unit CG1 serves to enable imaging with very high NA values, improved image contrast and optimal light intensity.

Next, upon exiting through the TIR region 110 of the image-side surface 102, light rays travel to COE 200. Specifically, as illustrated in FIG. 5, when the light rays exit the TIR region 110 of COE 100 and enter the second catadioptric optical group CG2 through the transmissive region 220 of the COE 200, the incoming rays undergo a third reflection by the curved image-side reflective region 210 (mirror M2) of the COE 200. Then, the rays are reflected back toward the object-side reflective surface 230 (mirror M3) of the COE 200. At this point, the light rays undergo a fourth reflection; that is, the reflective mirror M3 reflects the light rays forward towards the object-side surface 202 along the optical axis AX.

As shown in FIG. 2, upon exiting through the transmissive region 270 of the image-side surface 202, the lens group LG first focuses the light rays onto a first intermediate image plane IMP1 to form an intermediate image IIM1. Thence forth, the intermediate image IIM1 serves as the object for the remainder of the lens group LG, which in turn forms a final image IM at the image plane IP.

Continuing to refer to FIGS. 2-5, it should be noted that, the reflective portion 120 of the object-side surface 101 (concave mirror M1) generates outward Petzval curvature. However, when light exits the first catadioptric optical unit CG1 (COE 100) and enters the second catadioptric optical unit CG2 (COE 200) and refractive index of CG1 for primary wavelength is the same as that of CG2, monochromatic aberrations hardly arise because the shape of image-side surface 102 of COE 100 is substantially the same as the shape of the object-side surface 201 of COE 200 and space between CG1 and CG2 is tiny. More specifically, it should be noted that the shape (flat surface) of the TIR region 110 on the image-side surface 102 of COE 100 is substantially the same as the shape (flat surface) of the transmissive portion 220 on the object-side surface 201 of COE 200. Moreover, the TIR region 110 on the image-side surface 102 of COE 100 is substantially parallel to the transmissive portion 220 on the object-side surface 201 of COE 200. In this manner, if the material (for example glass) of CG1 is the same as that of CG2, chromatic aberrations hardly occur. More specifically, if the shape of the image-side surface 102 is the same as that of the transmissive portion 220, sign of aberration generated by 220 is opposite from one generated by 102. In addition, since height of light rays on 102 is the same as one on 220 because of the small distance between CG1 and CG2, an amount of aberration by 102 is the same as that of 220. Nevertheless, the outward Petzval curvature remains in the light rays entering the COE 200. Then light rays are reflected backwards by the concave mirror M2 in a convergent manner toward the convex mirror M3. This time, the concave mirror M2 further adds outward Petzval curvature. In turn, the convex mirror M3 focuses the light rays at the intermediate image plane IMP1 to form the intermediate image IIM1. Advantageously, the convex mirror M3 generates inward Petzval curvature enough to compensate for the outward Petzval curvature generated by the concave mirrors M1 and M2. After that, the lens group LG generates the final image IM, at the image plane IP. In order to simply fabrication and alignment, it may be preferable that the lens group LG may be designed to compensate for any aberrations therein separately from the catadioptric optical units CG1 and CG2.

<Six-Reflection Catadioptric System>

According to the present invention disclosed herein, there are two types of six-reflection catadioptric systems. One has one intermediate image and the other has two intermediate images.

Figure 6:
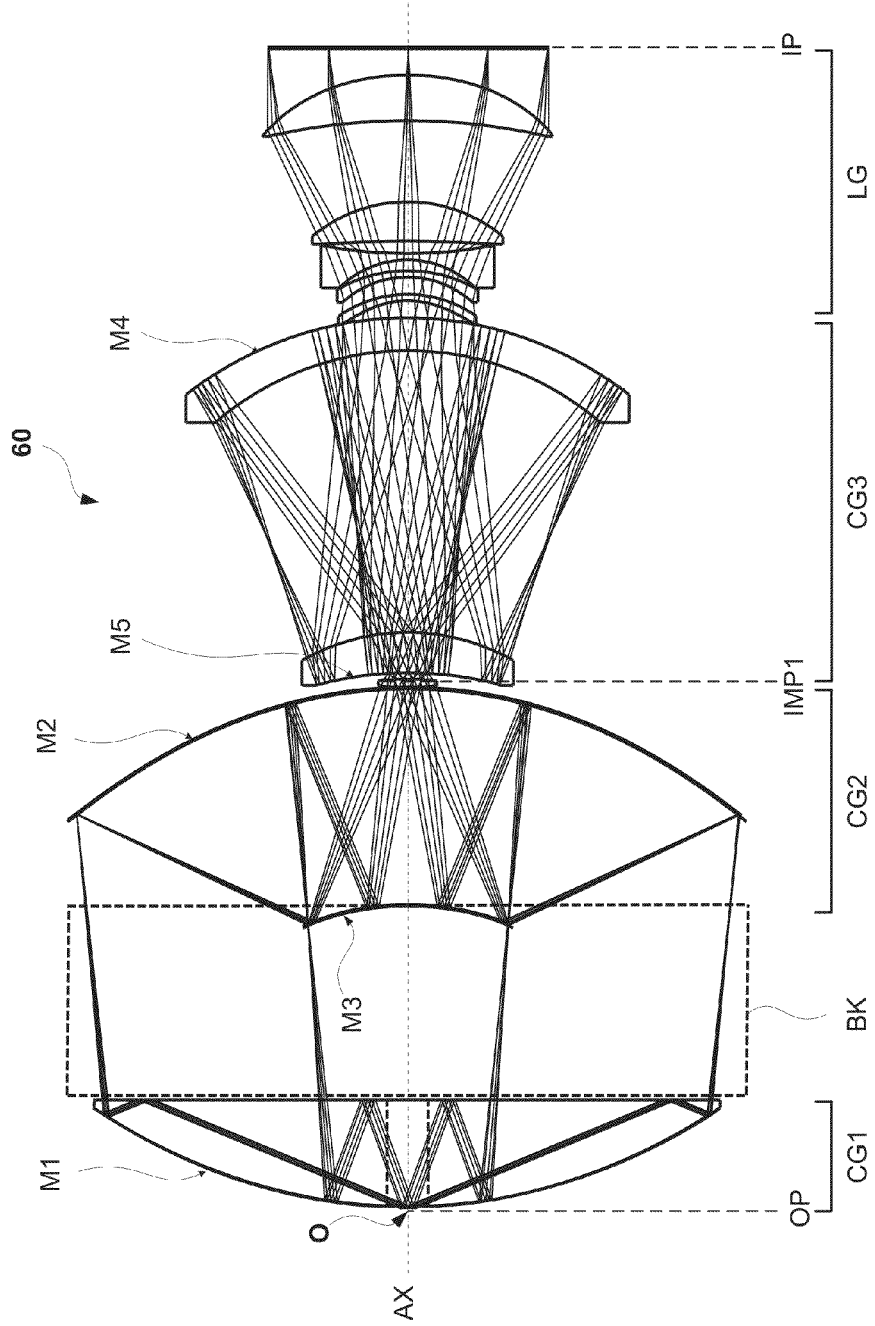
FIG. 6 illustrates a catadioptric optical system including a plurality of catadioptric units with six times reflection and one intermediate image, in accordance with an embodiment of the present invention.

FIG. 6 illustrates a catadioptric optical system 60 including a plurality of catadioptric units with six times reflection and one intermediate image, in accordance with an embodiment of the present invention. As illustrated in FIG. 6, the catadioptric optical system 60 includes, in order from the object side to the image side and aligned along an optical axis AX (in axial alignment), a first catadioptric optical unit CG1, a second catadioptric optical unit CG2, a third catadioptric optical unit CG3 and a lens group LG.

As it can be understood by persons having ordinary skill in the art, catadioptric optical units CG1 and CG2 in the catadioptric optical system 60 are substantially similar to the corresponding catadioptric optical units already described above in reference to FIGS. 2-5. Accordingly, to avoid unnecessary repetition, elements having reference numbers already described will not be described again. For example, in FIG. 6, the first catadioptric optical unit CG1 of the catadioptric optical system 60 is essentially identical to CG1 of catadioptric optical system 10 in FIG. 2. Similarly, the second catadioptric optical unit CG2 in FIG. 6 may be similar to CG2 of catadioptric optical system 10 in FIG. 2. Alternatively, however, as illustrated in FIG. 6, the second catadioptric optical unit CG2 may be constructed of a concave mirror M2 and a convex mirror M3, or other combination of catoptric and dioptric optical elements. Notably, the concave mirror M2 includes a refractive (transmissive) portion centered on a central region thereof aligned with the optical axis AX. The third catadioptric optical unit CG3 is formed by two Mangin mirrors M4 and M5, respectively providing specularly reflective surfaces on the image side and object side of CG3. More specifically, at the object side of CG3, a first Mangin mirror provides a specularly reflective surface which is convex towards the image side. And, at the image side of CG3, a second Mangin mirror provides a specularly reflective surface which is concave towards the object side thereof.

Turning now to the optical path from the object plane OP to the image plane IP, in the optical system 60 of FIG. 6, the light path is a follows. The light rays propagate from the object plane OP to the intermediate image plane IMP1 in a manner similar to that of the four-reflection catadioptric system described above in reference to FIGS. 2-5 above. Accordingly, as described above, the first four reflections of the optical system serve to form a first intermediate image IIM1 at the intermediated image plane IMP1.

Then, light rays from the intermediate image IIM1 travel towards the image side through a transmissive region of the first Mangin mirror M5 to reach a specularly reflective surface of the second Mangin mirror M4. Light rays impinging on the Mangin mirror M4 undergo a fifth reflection and are reflected backwards (in a convergent manner) towards the object side to reach a specularly reflective region of the first Mangin mirror M5 (in an outer region thereof). In turn, the light rays undergo a sixth reflection on the specularly reflective region of the first Mangin mirror M5; and after being reflected by the Mangin mirror M5, light rays transmit through a transmissive portion (an area not coated with reflection coating) of the Mangin mirror M4. Upon exiting from the Mangin mirror M4, the lens group LG focuses the light rays onto the image plane IP to form the final image IM. Accordingly, it can be said that the intermediate image IIM1 formed at the intermediate image plane IMP1 by the first four reflections of the optical system 60 serve as the object to be imaged by the third catadioptric optical unit CG3 and the lens group LG.

Advantageously, in the catadioptric optical system of FIG. 6, CG1 and CG2 are designed to substantially minimize chromatic aberrations to negligible levels, and the mirrors M1, M2 and M3 are respectively designed to generate outward, outward and inward Petzval curvature. Therefore, the first and second catadioptric optical units CG1 and CG2 can substantially compensate their respective aberrations, as described above in reference to the four-reflection catadioptric system 10. In addition, in the catadioptric system 60, the concave Mangin mirror M4 generates outward Petzval curvature and the convex Mangin mirror M5 generates inward Petzval curvature. In this manner, it is envisioned that the Petzval curvature of the Mirror M4 and M5 can compensate each other to generate a final image IM substantially free of Petzval curvature or chromatic aberrations. In the case that convex mirror M5 generates excessive inward Petzval curvature, the lens group LG can be designed to generate outward Petzval curvature sufficient to compensate for that not compensated by the mirror M4. The opposite may also be true. That is, in the case that concave mirror M4 generates excessive outward Petzval curvature, the lens group LG can be designed to generate inward Petzval curvature sufficient to compensate for that not compensated by the mirror M5.

Figure 7:
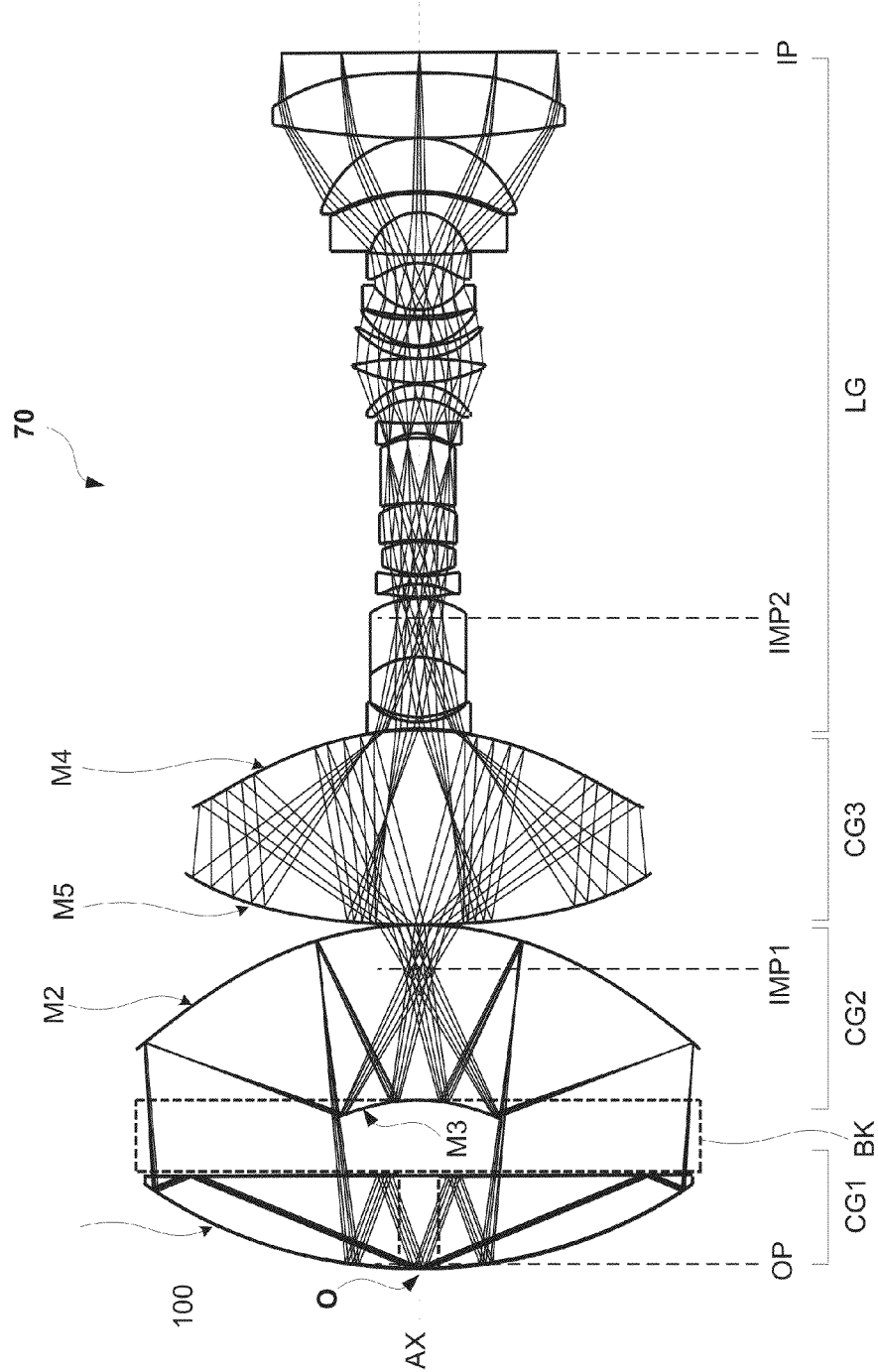
FIG. 7 illustrates a catadioptric optical system including a plurality of catadioptric units with six times reflection and two intermediate images, in accordance with an embodiment of the present invention.

FIG. 7 illustrates a catadioptric optical system 70 including a plurality of catadioptric units with six times reflection and two intermediate images, in accordance with an embodiment of the present invention. As illustrated in FIG. 7, the catadioptric optical system 70 includes, in order from the object side to the image side and aligned along an optical axis AX (in axial alignment), a first catadioptric optical unit CG1, a second catadioptric optical unit CG2, a third catadioptric optical unit CG3, and a lens group LG.

In FIG. 7, the first catadioptric optical unit CG1 of the catadioptric optical system 70 is essentially identical to CG1 of the catadioptric optical system 10 in FIG. 2. Similarly, the second catadioptric optical unit CG2 in FIG. 7 may be identical to CG2 of catadioptric optical system 10 in FIG. 2. Alternatively, however, in FIG. 7, the second catadioptric optical unit CG2 may be constructed of a concave mirror M2 and a convex mirror M3. Preferably, the concave mirror M2 includes a transmissive portion centered on a central region thereof aligned with the optical axis AX. The third catadioptric optical unit CG3 is formed by a pair of specularly reflective mirrors M4 and M5, respectively, on the image side and object side of the catadioptric optical unit CG3. Notably, in contrast to the catadioptric optical system of FIG. 6, the catadioptric optical system of FIG. 7 generates two intermediate images to form a final image IM of an object O.

More specifically, in the catadioptric optical system 70 of FIG. 7, the optical path from the object plane OP to the image plane IP includes six reflections each provided at respective specularly reflective surfaces of Mirrors M1 to M6. The path of light rays from the object O to the first intermediate image plane IMP1 is similar to that of the four-reflection catadioptric system described above with reference to FIGS. 1-5, whereby a first intermediate image IIM1 is formed at the first intermediate image plane IMP1. One notable feature in the catadioptric optical system of FIG. 7 is that the first intermediate image plane IMP1 is located between the mirror M2 and the mirror M3; that is, within second catadioptric optical unit CG2. The second intermediate image plane is located on the image side of the third catadioptric optical unit CG3. Accordingly, light rays from first intermediate image IIM1 goes through respective transmissive sections (hollow or non-reflective regions) of mirror M2 and mirror M5. Therefore, light rays corresponding to the first intermediate image IIM1 are first reflected towards the object side by the mirror M4. After that, this light rays are reflected towards the image side by the mirror M5, whereby the light rays go through transmissive sections (hollow or non-reflective regions) of mirror M4. Upon exiting through mirror M4, the light rays are focused on the second intermediate image plane IMP2 to form the second intermediate image IIM2. The second intermediate image IIM2 now serves as the object for the lens group LG, which forms the final image IM at the image plane IP.

Advantageously, in the catadioptric optical system of FIG. 7, CG1 and CG2 are designed to substantially minimize chromatic aberrations to negligible levels, and the mirrors M1, M2 and M3 are respectively designed to generate outward, outward and inward Petzval curvature. Therefore, the first and second catadioptric optical units CG1 and CG2 can substantially compensate their respective aberrations, as described above in reference to the four-reflection catadioptric system 10. In addition, in the catadioptric system 70, the concave mirror M4 generates outward Petzval curvature and the concave mirror M5 generates further outward Petzval curvature. In this case, since the Petzval curvature of the mirrors M4 and M5 are cumulative to each other, to generate a final image IM substantially free of Petzval curvature, the lens group LG is used to generate inward Petzval curvature sufficient to compensate for the cumulative outward Petzval curvature of mirror M4 and M5.

<Eight-Reflection Catadioptric System>

Figure 8:
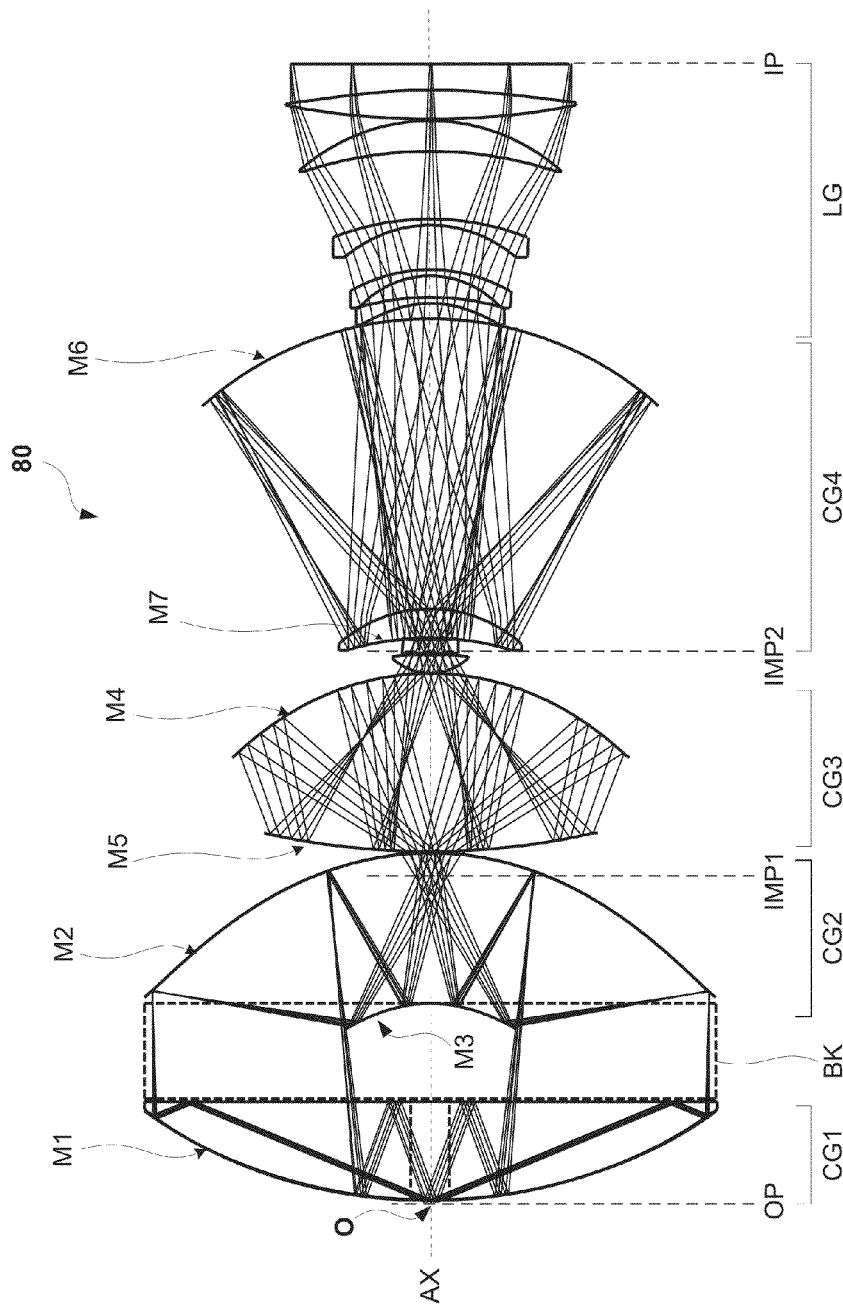
FIG. 8 illustrates a catadioptric optical system including a plurality of catadioptric units with eight times reflection and two intermediate images, in accordance with an embodiment of the present invention.

FIG. 8 illustrates a catadioptric optical system including a plurality of catadioptric units with eight times reflection and two intermediate images, in accordance with an embodiment of the present invention. In FIG. 8, the catadioptric optical system 80 includes, in order from an object plane OP to an image plane IP and aligned along an optical axis AX (in axial alignment), a first catadioptric optical unit CG1, a second catadioptric optical unit CG2, a third catadioptric optical unit CG3, a fourth catadioptric optical unit CG4, and a lens group LG.

In FIG. 8, the first catadioptric optical unit CG1, the second catadioptric optical unit CG2, and the third catadioptric optical unit CG3 of the catadioptric optical system 80 are essentially identical to CG1, CG2 and CG3 of the catadioptric optical system 70 in FIG. 6, respectively. Thus, repetitious description is omitted for the sake of brevity. Similarly, as in the catadioptric optical system 70 of FIG. 7, the catadioptric optical system 80 of FIG. 8 generates two intermediate images IIM1 and IIM2, respectively at a first intermediate image plane IMP1 and second intermediate image plane IMP2 to form a final image IM of an object O.

More specifically, the path of light rays from the object plane OP to the second intermediate image plane IMP2 is similar to that of the six-reflection catadioptric system described above with reference to FIG. 7, whereby the second intermediate image IIM2 is formed at the second intermediate image plane IMP2 on the image side of the third catadioptric optical group 3. In FIG. 8, the additional (fourth) catadioptric optical group CG4 is formed by a specularly reflective mirror M6 and a Mangin mirror M7. The mirror M6 is concave towards the object side, while the Mangin mirror M7 has a reflective surface convex towards the image side of the optical system 80.

In FIG. 8, the second intermediate image IIM2 serves as the object for the fourth catadioptric optical unit CG4 and the lens group LG. Specifically, light rays from the second intermediate image plane IMP2 first go through a transmissive section (hollow or non-reflective region) of mirror M7 and are reflected back towards the object side by the mirror M6. After that, this light rays are reflected towards the image side by the mirror M7, whereby the light rays go through transmissive sections (hollow or non-reflective regions) of mirror M6. Upon exiting through mirror M6, the light rays are focused by the lens group LG on the final image plane IP to form the final image IM.

Advantageously, in the catadioptric optical system of FIG. 8, CG1 and CG2 are designed to substantially minimize chromatic aberrations to negligible levels, and the mirrors M1, M2 and M3 are respectively designed to generate outward, outward and inward Petzval curvature. In addition, similar to FIG. 7, the concave mirrors M4 and M5 of FIG. 8 generate cumulative outward Petzval curvature. In addition, in the catadioptric system 80, the mirror M6 generates further outward Petzval curvature, while the convex mirror M7 generates inward Petzval curvature. It is envisioned that the inward Petzval curvature of mirror M7 can completely compensate for the cumulative outward Petzval curvature of M4, M5 and M6. However, in a case where the cumulative Petzval curvature of mirrors M4, M5 and M6 is not completely compensated for by the convex mirror M7, the lens group LG can be designed to generate either outward or inward Petzval curvature, as necessary. In the example illustrated in FIG. 8, the lens group LG preferably generates outward Petzval curvature sufficient to completely compensate for the Petzval curvature generated by mirrors M4 to M7.

Table 1 presents a summary of the capability of correcting Petzval curvature provided by each of the catadioptric optical systems 20, 60, 70 and 80 described above with reference to FIGS. 2, 6, 7 and 8, respectively.

TABLE 1

Summary of Petzval curvature correction

| | CG1 | | | CG2 | | CG3 | | CG4 |
|---|---|---|---|---|---|---|---|---|
| | TIR | M1 | M2 | M3 | M4 | M5 | M6 | M7 | LG |
| FIG. 2 | 0 | outward (−) | outward (−) | inward (+) | n/a | n/a | n/a | n/a | 0 |
| FIG. 6 | 0 | outward (−) | outward (−) | inward (+) | outward (−) | inward (+) | n/a | n/a | outward (−) |
| FIG. 7 | 0 | outward (−) | outward (−) | inward (+) | outward (−) | outward (−) | n/a | n/a | inward (+) |
| FIG. 8 | 0 | outward (−) | outward (−) | inward (+) | outward (−) | outward (−) | outward (−) | inward (+) | outward (−) |

From Table 1, it can be appreciated how the respective catadioptric units offset (cancel out) the outward and inward Petzval curvatures. For example, in system 20 corresponding to FIG. 2, the sum of outward (negative) Petzval curvatures provided by concave mirrors M1 and M2 is cancelled out by the inward (positive) Petzval curvature of mirror M3 (see details FIG. 5). The same analysis applies to FIGS. 6, 7 and 8.

Table 2 presents a summary of the capability of correcting axial chromatic aberration provided by each of the catadioptric optical systems 20, 60, 70 and 80 described above with reference to FIGS. 2, 6, 7 and 8, respectively.

TABLE 2

Summary of axial chromatic aberration correction

| | CG1 | CG2 | CG3 | CG4 | L |
|---|---|---|---|---|---|
| FIG. 2 | − | + | | | 0 |
| FIG. 6 | − | + | + | | − |
| FIG. 7 | − | + | 0 | | + |
| FIG. 8 | − | + | 0 | + | − |

Table 2, indicates that in the system 20 corresponding to FIG. 2, negative chromatic aberration of the first catadioptric unit CG1 is offset (cancelled out) by the positive axial chromatic aberration generated by the second catadioptric component CG2. Moreover, for the optical systems 60, 70 and 80 corresponding to FIGS. 6, 7 and 8, respectively, the group lens LG can be specifically designed to provide negative or positive axial chromatic aberration, as necessary.

In this manner, it is readily evident that the various examples of above-disclosed catadioptric optical system can produce images close to theoretical limits, which has not been known heretofore to the inventors herein.

A summary of the image quality obtained when using the optical system 20, 60, 70 and 80 of FIG. 2, 6, 7 or 8, respectively is tabulated in Table 3 below.

TABLE 3

Summary of system characteristic and image quality

| | Total length (mm) | Aberration (mwaves) |
|---|---|---|
| FIG. 2 | 1800 | 80 |
| FIG. 6 | 550 | 41 |
| FIG. 7 | 590 | 30 |
| FIG. 8 | 550 | 64 |

NUMERICAL EXAMPLES

Data corresponding to numerical examples 1 through 4 representative of the catadioptric optical systems 20, 60, 70 and 80 respectively illustrated in FIGS. 2, 6, 7 and 8 are next explained. In each of the numerical examples presented herein, the reference indicia "i" (where i=1, 2, 3 . . . ) denotes the order of surfaces in the optical system from the object plane OP to the image plane IP. With this premise, the "Radius" data Ri corresponds to an $i^{th}$ radius of curvature (at the $i^{th}$ plane); thickness Ti denotes an on-axis distance or space between the ith and $(i+1)^{th}$ surface; the reference ndi and vdi respectively denote the index of refraction and Abbe number of the material of the $i^{th}$ optical element with respect to the Fraunhoffer d-line. A surface number without data for ndi and vdi indicates that this surface number represents an air space. A radius R=1.00E+18 (where 1E+X is equivalent to $1 \times 10^{+x}$) denotes a substantially infinite radius, i.e., a flat surface. In addition, in each numerical example, it is assumed that the object O is located on the object side of the first optical surface and at an object plane OP and on the optical axis AX; that is, the object O is assumed to be in axial alignment with the optical system. An aperture stop STO is assumed located at a relative far distance from object O so that the object space can be considered substantially telecentric. Specifically, in order to form an object-space telecentric system (i.e., a system that has the exit pupil effectively at infinity) an aperture stop STO is considered to be located at the front focal point of the system. Herein, when the exit pupil is located at a distance of at least 100000 mm away from the object plane OP it is said that the exit pupil are effectively at infinity. In each numerical example, the object O is considered to be immersed in a fluid with a refractive index matching the refractive index of the first optical element. Where present, aspherical surfaces are denoted by an asterisk ("*") added next to the surface number.

In each aspheric surface, a conic constant is denoted by k (where k is a number that describes a conic surface, being zero for a sphere, −1 for a paraboloid, and with other values to describe any conic of revolution); aspherical polynomial order coefficients are denoted by A, B, C, D, E, F, G, J . . . which are $4^{th}$, $6^{th}$, $8^{th}$, $10^{th}$, $12^{th}$, $14^{th}$ and $16^{th}$ order coefficient respectively; and a displacement in the direction of the optical axis at a position of height h from the optical axis is denoted by z with reference to an apex of the surface. The displacement in the aspherical surface is based on Equation (6) given below:

$$z = \frac{ch^2}{1 + \sqrt{1 - (1+k)c^2 h^2}} + Ah^4 + Bh^6 + Ch^8 + Dh^{10} + Eh^{12} + Fh^{14} + Gh^{16} + Hh^{18} + Jh^{20} + \ldots$$

Numerical Example 1 (corresponds to optical system 20 of FIG. 2). Numerical Example 2 (corresponds to optical system 60 of FIG. 6). Numerical Example 3 (corresponds to optical system 70 of FIG. 7). Numerical Example 4 (corresponds to optical system 80 of FIG. 8).

TABLE 4

Optical element data for Numerical Example 1

| Surface | Radius | Thickness | Index | Abbe Number |
|---|---|---|---|---|
| 1 | 1.00E+18 | 8.750 | 1.773 | 49.56 |
| 2* | 255.983 | 30.625 | 1.773 | 49.56 |
| 3 | 1.00E+18 | −30.625 | 1.773 | 49.56 |
| 4* | 255.983 | 30.625 | 1.773 | 49.56 |
| 5 | 1.00E+18 | 0.035 | | |
| 6 | 1.00E+18 | 161.234 | 1.773 | 49.56 |
| 7 | −246.708 | −140.000 | 1.773 | 49.56 |
| 8* | −120.205 | 140.000 | 1.773 | 49.56 |
| 9* | 86.200 | 8.167 | | |
| 10 | 132.882 | 16.333 | 1.757 | 47.81 |
| 11 | −402.694 | 8.167 | | |
| 12 | −812.878 | 9.333 | 1.776 | 37.84 |
| 13 | −476.200 | 3.500 | | |
| 14 | 70.474 | 8.167 | 1.773 | 49.56 |
| 15 | 78.519 | 20.448 | | |
| 16 | −124.916 | 93.333 | 1.523 | 58.59 |
| 17 | −78.588 | 173.980 | 1.434 | 95.23 |
| 18 | −107.631 | 1.167 | | |
| 19 | 133.597 | 29.167 | 1.523 | 58.59 |
| 20 | −471.905 | 35.000 | 1.434 | 95.23 |
| 21 | −380.368 | 9.333 | | |
| 22 | −148.438 | 17.500 | 1.523 | 58.59 |
| 23 | −90.784 | 35.000 | 1.434 | 95.23 |
| 24 | 92.652 | 29.167 | | |
| 25 | −88.440 | 46.667 | 1.434 | 95.23 |
| 26 | −70.328 | 5.833 | 1.523 | 58.59 |
| 27 | 219.984 | 1.167 | | |
| 28 | 230.606 | 58.333 | 1.434 | 95.23 |
| 29 | −79.789 | 5.833 | 1.523 | 58.59 |
| 30 | −292.122 | 15.155 | | |
| 31 | 362.219 | 75.833 | 1.434 | 95.23 |
| 32 | −127.723 | 14.000 | 1.523 | 58.59 |
| 33 | −188.635 | 1.167 | | |
| 34 | 306.436 | 14.000 | 1.523 | 58.59 |
| 35 | 155.430 | 58.333 | 1.434 | 95.23 |
| 36* | −318.262 | 815.668 | | |
| IM | 1.00E+18 | 0.000 | | |

TABLE 5 aspherical coefficients Numerical Example 1

| Surface | k | A | B | C | D | E | F | G |
|---|---|---|---|---|---|---|---|---|
| 2, 4 | −3.37E+00 | −2.99E−10 | 4.92E−13 | 7.27E−17 | −1.86E−20 | 1.93E−24 | −9.72E−29 | 1.93E−33 |
| 7 | −4.75E−01 | −3.91E−09 | −1.80E−14 | −1.59E−18 | 7.95E−23 | 1.82E−27 | −2.06E−31 | 5.33E−36 |
| 8 | 1.51E+00 | −8.69E−08 | −1.33E−11 | −3.01E−14 | 3.51E−17 | −3.02E−20 | 1.21E−23 | −2.06E−27 |
| 9 | −1.71E+00 | 0.00E+00 | 0.00E+00 | 0.00E+00 | 0.00E+00 | 0.00E+00 | 0.00E+00 | 0.00E+00 |
| 36 | 0.00E+00 | 2.61E−08 | 4.11E−14 | 6.24E−18 | 1.62E−22 | 0.00E+00 | 0.00E+00 | 0.00E+00 |

TABLE 6

Optical element data for Numerical Example 2

| Surface | Radius | Thickness | Index | Abbe Number |
|---|---|---|---|---|
| 1 | 1.00E+18 | 1.000 | 1.773 | 43.00 |
| 2* | 274.468 | 50.914 | 1.773 | 43.00 |
| 3 | 1.00E+18 | −50.914 | 1.773 | 43.00 |
| 4* | 274.468 | 50.914 | 1.773 | 43.00 |
| 5 | 1.00E+18 | 0.050 | | |
| 6 | 1.00E+18 | 0.000 | 1.773 | 49.57 |
| 7 | 1.00E+18 | 92.112 | 1.773 | 49.57 |
| 8 | 1.00E+18 | 102.968 | 1.773 | 49.57 |
| 9* | −239.095 | −102.968 | 1.773 | 49.57 |
| 10* | −135.734 | 102.968 | 1.773 | 49.57 |
| 11* | −239.095 | 0.500 | | |
| 12 | 251.704 | 3.607 | 1.694 | 49.49 |
| 13* | −262.455 | 3.209 | | |
| 14* | −184.313 | 19.157 | 1.702 | 48.60 |
| 15 | −112.861 | 133.265 | | |
| 16 | −153.995 | 15.676 | 1.496 | 65.36 |
| 17* | −187.748 | −15.676 | 1.496 | 65.36 |
| 18 | −153.995 | −133.265 | | |
| 19 | −112.861 | −19.157 | 1.702 | 48.60 |
| 20* | −184.313 | 19.157 | 1.702 | 48.60 |
| 21 | −112.861 | 133.265 | | |
| 22 | −153.995 | 15.676 | 1.496 | 65.36 |
| 23* | −187.748 | 7.991 | | |
| 24* | −47.077 | 3.000 | 1.487 | 70.41 |
| 25 | −64.217 | 8.816 | | |
| 26 | −50.834 | 3.000 | 1.755 | 27.58 |
| 27 | −71.830 | 4.916 | | |
| 28* | −50.373 | 3.000 | 1.744 | 44.50 |
| 29 | 255.151 | 6.098 | | |
| 30 | −563.765 | 18.178 | 1.750 | 33.24 |
| 31 | −78.039 | 38.871 | | |
| 32 | −320.459 | 21.734 | 1.705 | 48.30 |
| 33* | −128.197 | 0.000 | | |
| 34 | 1.00E+18 | 11.941 | | |
| IM | 1.00E+18 | 0.000 | | |

TABLE 7 aspherical coefficients Numerical Example 2

| Surface | k | A | B | C | D | E | F | G |
|---|---|---|---|---|---|---|---|---|
| 2, 4 | −1.71E−01 | −1.02E−09 | −1.43E−13 | 8.91E−18 | −4.50E−22 | 1.66E−26 | −3.34E−31 | 2.91E−36 |
| 9, 11 | −6.81E−01 | −1.68E−09 | 1.63E−14 | 9.12E−19 | −2.99E−23 | 3.33E−27 | −1.19E−31 | 1.98E−36 |
| 10 | 3.91E+00 | 2.57E−07 | 9.64E−12 | 3.94E−15 | 1.30E−21 | −5.94E−25 | 1.24E−28 | |
| 13 | 0.00E+00 | 2.88E−06 | −7.58E−09 | 3.48E−11 | −7.32E−14 | −2.07E−41 | 1.58E−35 | 0.00E+00 |
| 14, 20 | 0.00E+00 | −8.76E−09 | −1.45E−12 | 5.58E−15 | −6.69E−18 | 4.35E−21 | −1.41E−24 | 1.80E−28 |
| 17, 23 | 0.00E+00 | 1.56E−09 | 4.95E−14 | 1.39E−18 | 4.44E−23 | 1.98E−26 | −2.56E−30 | 1.07E−34 |
| 24 | 0.00E+00 | 1.31E−06 | 7.60E−10 | 2.45E−13 | 3.94E−17 | 2.10E−36 | 0.00E+00 | 0.00E+00 |
| 28 | 0.00E+00 | 4.61E−07 | −2.04E−10 | −1.20E−14 | −4.23E−17 | −8.36E−35 | 0.00E+00 | 0.00E+00 |
| 33 | 0.00E+00 | −1.91E−07 | −3.08E−12 | 3.66E−15 | −1.82E−18 | 2.99E−22 | −2.09E−26 | 0.00E+00 |

TABLE 8

Optical element data for Numerical Example 3

| Surface | Radius | Thickness | Index | Abbe Number |
|---|---|---|---|---|
| 1 | 1.00E+18 | 1.00E+00 | 1.773 | 38.57 |
| 2* | 274.468 | 45.000 | 1.773 | 38.57 |
| 3 | 1.00E+18 | −45.000 | 1.773 | 38.57 |
| 4* | 274.468 | 45.000 | 1.773 | 38.57 |
| 5 | 1.00E+18 | 0.050 | | |
| 6 | 1.00E+18 | 0.000 | 1.773 | 49.57 |
| 7 | 1.00E+18 | 16.888 | 1.773 | 49.57 |
| 8 | 1.00E+18 | 80.106 | 1.773 | 49.57 |
| 9* | −165.827 | −80.106 | 1.773 | 49.57 |
| 10* | −81.042 | 80.106 | 1.773 | 49.57 |
| 11* | −165.827 | 0.500 | | |
| 12* | 369.409 | 94.151 | | |
| 13* | −168.955 | −94.151 | | Mirror |
| 14* | 369.409 | 94.151 | Mirror | |
| 15* | −168.955 | 0.500 | | |
| 16 | 54.206 | 3.000 | 1.572 | 42.76 |
| 17* | 27.136 | 6.908 | | |
| 18 | −33.810 | 16.748 | 1.487 | 70.41 |
| 19 | −14.471 | 6.993 | 1.749 | 34.26 |
| 20 | −22.742 | 0.500 | | |
| 21* | 56.376 | 9.638 | 1.744 | 44.85 |
| 22 | −23.172 | 3.000 | 1.755 | 27.58 |
| 23 | 55.606 | 0.500 | | |
| 24* | 25.588 | 9.385 | 1.713 | 47.52 |
| 25 | −48.717 | 1.500 | | |
| 26 | −1005.238 | 13.737 | 1.718 | 29.24 |
| 27 | −40.701 | 0.500 | | |
| 28 | −61.949 | 25.595 | 1.755 | 27.58 |
| 29 | −35.155 | 2.247 | | |
| 30* | −17.976 | 3.000 | 1.487 | 70.41 |
| 31 | −61.677 | 3.530 | | |
| 32 | −26.577 | 12.215 | 1.755 | 27.58 |
| 33 | −32.199 | 0.500 | | |
| 34* | 62.308 | 9.790 | 1.755 | 27.58 |
| 35 | −280.605 | 0.500 | | |
| 36 | 32.104 | 8.730 | 1.744 | 44.85 |
| 37 | 51.561 | 1.481 | | |
| 38 | 58.700 | 3.000 | 1.754 | 29.19 |
| 39* | 95.600 | 0.500 | | |
| 40 | 40.972 | 5.412 | 1.744 | 44.85 |
| 41 | 27.450 | 15.703 | | |
| 42* | −26.048 | 3.000 | 1.569 | 61.41 |
| 43 | −118.638 | 15.765 | | |
| 44 | −22.264 | 3.000 | 1.755 | 27.58 |
| 45* | −97.187 | 0.500 | | |
| 46 | −108.872 | 35.641 | 1.495 | 69.55 |
| 47 | −44.046 | 0.500 | | |
| 48 | 530.174 | 28.788 | 1.755 | 28.04 |
| 49* | −264.831 | 9.912 | | |
| 50 | 1.00E+18 | 0.089 | | |
| IM | 1.00E+18 | 0.000 | | |

TABLE 9 aspherical coefficients Numerical Example 3

| Surface | K | A | B | C | D | E | F | G |
|---|---|---|---|---|---|---|---|---|
| 2, 4 | 3.17E−01 | 6.83E−09 | −5.23E−13 | 2.36E−17 | −8.47E−22 | 1.98E−26 | −2.75E−31 | 0.00E+00 |
| 9, 11 | −4.69E−01 | 1.75E−09 | 2.87E−13 | 1.13E−17 | 1.15E−22 | 1.15E−26 | −1.26E−30 | 2.11E−35 |
| 10 | 1.92E+00 | 1.26E−06 | 1.49E−12 | −1.35E−14 | 2.23E−17 | 1.72E−20 | −1.17E−23 | 3.79E−27 |
| 12, 14 | 1.47E−01 | 4.90E−08 | −2.25E−12 | 2.87E−16 | −2.44E−20 | 1.66E−24 | −6.70E−29 | 1.34E−33 |
| 13, 15 | −6.89E−04 | 2.24E−08 | 1.35E−12 | 5.53E−17 | 3.19E−21 | 3.19E−26 | 6.15E−30 | −2.89E−34 |
| 17 | −6.89E−04 | 2.24E−08 | 1.35E−12 | 5.53E−17 | 3.19E−21 | 3.19E−26 | 6.15E−30 | −2.89E−34 |
| 21 | 0.00E+00 | 2.51E−06 | −1.42E−08 | 5.99E−12 | −1.29E−15 | −4.78E−33 | −6.05E−32 | −1.12E−27 |
| 24 | 0.00E+00 | −1.57E−05 | −3.66E−09 | −1.31E−11 | −8.93E−15 | −2.38E−32 | −1.48E−31 | −9.16E−24 |
| 30 | 0.00E+00 | 4.08E−05 | 5.99E−08 | −1.97E−10 | 5.63E−13 | 8.12E−34 | −1.02E−31 | −5.07E−31 |
| 34 | 0.00E+00 | −4.87E−07 | 4.08E−09 | −7.65E−12 | 5.86E−15 | −3.66E−32 | −3.19E−21 | 1.53E−24 |
| 39 | 0.00E+00 | 1.30E−05 | 3.85E−09 | −2.85E−12 | 9.32E−15 | −1.11E−31 | −6.12E−24 | 2.41E−23 |
| 42 | 0.00E+00 | 7.81E−06 | 1.02E−08 | 5.20E−12 | 3.00E−14 | −9.93E−32 | 1.95E−26 | 1.61E−22 |
| 45 | 0.00E+00 | 3.13E−07 | 2.17E−11 | −1.81E−13 | 8.81E−17 | −1.87E−30 | −2.66E−23 | 9.77E−27 |
| 49 | 0.00E+00 | −3.68E−07 | −1.49E−10 | 8.15E−14 | −1.83E−17 | 2.09E−21 | −1.05E−25 | 8.96E−31 |

TABLE 10

Optical element data for Numerical Example 4

| Surface | Radius | Thickness | Index | Abbe Number |
|---|---|---|---|---|
| 1 | 1.00E+18 | 1.000 | 1.773 | 49.57 |
| 2* | 274.468 | 47.301 | 1.773 | 49.57 |
| 3 | 1.00E+18 | −47.301 | 1.773 | 49.57 |
| 4* | 274.468 | 47.301 | 1.773 | 49.57 |
| 5 | 1.00E+18 | 0.050 | | |
| 6 | 1.00E+18 | 0.000 | 1.773 | 49.57 |
| 7 | 1.00E+18 | 47.742 | 1.773 | 49.57 |
| 8 | 1.00E+18 | 73.046 | 1.773 | 49.57 |
| 9* | −158.913 | −73.046 | 1.773 | 49.57 |
| 10* | −69.811 | 73.046 | 1.773 | 49.57 |
| 11* | −158.913 | 0.500 | | |
| 12* | 412.868 | 85.772 | | |
| 13* | −141.555 | −85.772 | Mirror | |
| 14* | 412.868 | 85.772 | Mirror | |
| 15* | −141.555 | 0.550 | | |
| 16 | 30.134 | 8.553 | 1.495 | 69.62 |
| 17* | 204.089 | 0.500 | | |
| 18 | 49724.927 | 6.991 | 1.521 | 54.89 |
| 19* | −656.038 | 0.712 | | |
| 20* | −163.948 | 13.944 | 1.509 | 59.46 |
| 21 | −72.497 | 140.645 | | |
| 22* | −183.487 | −140.645 | Mirror | |
| 23 | −72.497 | −13.944 | 1.509 | 59.46 |
| 24* | −163.948 | 13.944 | 1.509 | 59.46 |
| 25 | −183.408 | 140.645 | | |
| 26* | −183.487 | 7.323 | | |
| 27* | −56.039 | 3.000 | 1.570 | 43.02 |
| 28 | −127.961 | 10.364 | | |
| 29 | −50.772 | 3.000 | 1.516 | 67.50 |
| 30 | −84.247 | 21.135 | | |
| 31 | −71.379 | 3.000 | 1.628 | 51.43 |
| 32 | −143.723 | 32.738 | | |
| 33 | −215.982 | 14.863 | 1.620 | 60.32 |
| 34 | −104.052 | 0.500 | | |
| 35 | 413.666 | 14.222 | 1.755 | 27.58 |
| 36* | −315.393 | 10.000 | | |
| 37 | 1.00E+18 | 2.551 | | |
| IM | 1.00E+18 | 0.000 | | |

TABLE 10 aspherical coefficients Numerical Example 4

| Surface | k | A | B | C | D | E | F | G |
|---|---|---|---|---|---|---|---|---|
| 2, 4 | −2.55E−01 | 5.41E−10 | 7.01E−14 | 4.23E−18 | 8.14E−23 | 4.93E−27 | −4.14E−31 | 1.28E−35 |
| 9, 11 | −6.75E−01 | −5.01E−09 | 5.70E−14 | 5.06E−18 | 1.88E−22 | 1.11E−26 | −3.08E−31 | 3.05E−35 |
| 10 | 5.41E−01 | 1.32E−06 | −2.45E−10 | 1.40E−13 | −4.92E−17 | 2.54E−20 | −7.88E−24 | 1.31E−27 |
| 12, 14 | 1.47E−01 | −7.30E−09 | 1.47E−12 | −3.87E−17 | −2.78E−21 | −2.92E−24 | 6.15E−28 | −3.24E−32 |
| 13, 15 | −6.89E−04 | 8.26E−09 | 4.09E−13 | 4.68E−17 | −5.00E−21 | 1.28E−24 | −1.12E−28 | 4.40E−33 |
| 17 | 0.00E+00 | −1.53E−05 | −3.02E−08 | 1.06E−10 | −6.59E−14 | −1.82E−31 | 2.50E−36 | 0.00E+00 |
| 19 | 0.00E+00 | 1.31E−05 | 6.18E−08 | −5.11E−10 | 2.25E−12 | 0.00E+00 | 0.00E+00 | 0.00E+00 |
| 20, 24 | 0.00E+00 | −1.06E−07 | −1.31E−11 | −2.11E−15 | 5.23E−19 | 3.18E−22 | −4.34E−25 | 1.42E−28 |
| 22, 26 | 0.00E+00 | −2.07E−09 | −5.20E−14 | 5.78E−19 | −1.72E−22 | 9.91E−27 | −1.02E−30 | 3.67E−35 |
| 27 | 0.00E+00 | 9.57E−07 | 2.50E−10 | 1.41E−14 | 3.27E−17 | 2.32E−34 | 0.00E+00 | 0.00E+00 |
| 36 | 0.00E+00 | 9.98E−08 | 1.81E−12 | −2.54E−15 | 4.47E−19 | −2.43E−23 | 0.00E+00 | 0.00E+00 |

While the various aspects of the present invention have been described with reference to exemplary embodiments, it is to be understood that the present invention is not limited to the above described embodiments. The scope of the following claims is to be accorded the broadest interpretation so as to encompass all such modifications and equivalent structures and functions.

What is claimed is:

1. A catadioptric optical system comprising, in order from an object side along an optical axis:
    a first catadioptric unit;
    a second catadioptric unit disposed so as to have a space from the first catadioptric unit; and
    a lens group,
    wherein the first catadioptric unit includes a first object-side surface having a concave specularly reflective portion, and a first image-side surface having a first transmissive portion and a total internal reflection portion surrounding the first transmissive portion,
    wherein the second catadioptric unit includes a second object-side surface having a convex specularly reflective portion and a second image-side surface having a concave specularly reflective portion, and
    wherein light rays from an object are sequentially reflected by the first image-side surface, the first object-side surface, the second image-side surface, and the second object-side surface.

2. The catadioptric optical system according to claim 1,
    wherein the second catadioptric unit is configured to form a first intermediate image by using light rays from the second object-side surface, and
    wherein the lens group is configured to form a final image based on the first intermediate image.

3. The catadioptric optical system according to claim 1,
    wherein the first image-side surface further includes a ring-shaped specularly reflective portion surrounding the first transmissive region, and
    wherein, among the light rays from the object, light rays incident on the total internal reflection portion are totally reflected and light rays incident on the ring-shaped specularly reflective portion are specularly reflected.

4. The catadioptric optical system according to claim 1,
    wherein the total internal reflection portion has a substantially flat shape,
    wherein the second object-side surface includes a second transmissive portion in a substantially flat shape surrounding the convex specularly reflective portion, and
    wherein the first image-side surface and the second object side-surface are made to face each other, such that the total internal reflection portion and the second transmissive portion are substantially parallel to each other.

5. The catadioptric optical system according to claim 1,
    wherein the first catadioptric unit consists of a single optical element made of an optically transparent solid material.

6. The catadioptric optical system according to claim 1, further comprising a third catadioptric unit disposed between the second catadioptric unit and the lens group.

7. The catadioptric optical system according to claim 6,
    wherein the third catadioptric unit includes, in order from the object side along the optical axis, an object-side Mangin mirror and an image-side Mangin mirror, and
    wherein the light rays from the second object-side surface are sequentially reflected by the image-side Mangin mirror and the object-side Mangin mirror.

8. The catadioptric optical system according to claim 7,
    wherein the image-side Mangin mirror includes a curved reflective surface concave towards the object side, and the object-side Mangin minor includes curved reflective surface convex towards the image side, and
    wherein the lens group is configured to form the final image by using light rays reflected by the curved reflective surface convex towards the image side.

9. The catadioptric optical system according to claim 6,
    wherein the second catadioptric unit is configured to form the first intermediate image on the object side of the third catadioptric unit.

10. The catadioptric optical system according to claim 6,
    wherein the third catadioptric unit includes, in order from the object side along the optical axis, an object-side specular mirror concave towards the image side, and an image-side specular mirror concave towards the object side, and
    wherein the light rays from the second object-side surface are sequentially reflected by the image-side specular mirror and the object-side specular mirror.

11. The catadioptric optical system according to claim 10,
    wherein the second catadioptric unit is configured to form the first intermediate image between the second image-side surface and the second object-side surface, and
    wherein the third catadioptric unit is configured to form a second intermediate image on the image side of the third catadioptric unit based on the first intermediate image, and
    wherein the lens group is configured to form the final image based on the second intermediate image.

12. The catadioptric optical system according to claim 6, further comprising a fourth catadioptric unit disposed between the third catadioptric unit and the lens group.

13. The catadioptric optical system according to claim 12,
    wherein the fourth catadioptric unit includes, in order from the object side along the optical axis, an object-side Mangin mirror and an image-side specular mirror, and
    wherein light rays from the third catadioptric unit are sequentially reflected by the image-side specular mirror and the object-side Mangin minor.

14. The catadioptric optical system according to claim 13,
    wherein the image-side specular mirror includes a curved reflective surface concave towards the object side, and the object-side Mangin minor includes a curved reflective surface convex towards the image side, and
    wherein the lens group is configured to form the final image by using the light rays reflected by the curved reflective surface convex towards the image side.

15. The catadioptric optical system according to claim 1, wherein:
    the concave specularly reflective portion on the first object-side surface generates outward Petzval curvature,
    the concave specularly reflective portion on the second image-side surface generates outward Petzval curvature,
    the convex specularly reflective portion on the second object-side surface generates inward Petzval curvature, and
    the sum of outward Petzval curvatures is cancelled out by the inward Petzval curvature.

16. The catadioptric optical system according to claim 7, wherein:
    the image-side Mangin mirror generates outward Petzval curvature,
    the object-side Mangin mirror generates inward Petzval curvature,
    the lens group generates outward Petzval curvature, and the sum of outward Petzval curvatures is cancelled out by the inward Petzval curvature.

17. The catadioptric optical system according to claim 10, wherein:
the image-side specular mirror generates outward Petzval curvature,
the object-side specular mirror generates outward Petzval curvature,
the lens group generates inward Petzval curvature, and
the sum of outward Petzval curvatures is cancelled out by the inward Petzval curvature.

18. The catadioptric optical system according to claim 14, wherein:
the image-side specular mirror generates outward Petzval curvature,
the object-side Mangin mirror generates inward Petzval curvature,
the lens group generates outward Petzval curvature, and
the sum of outward Petzval curvatures is cancelled out by the inward Petzval curvature.

* * * * *